(12) United States Patent
Pagonis et al.

(10) Patent No.: US 11,800,344 B2
(45) Date of Patent: Oct. 24, 2023

(54) COMPUTER-IMPLEMENTED METHOD OF PROCESSING AN EMERGENCY INCIDENT AND EMERGENCY COMMUNICATION NETWORK

(71) Applicant: Unify Patente GmbH & Co. KG, Munich (DE)

(72) Inventors: Athanasios Pagonis, Vrilissia (GR); Zisis Tsiatsikas, Salonika (GR); Marietta Mikrouli, Attiki (GR); Sofia Anagnostou, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 61 days.

(21) Appl. No.: 17/536,247

(22) Filed: Nov. 29, 2021

(65) Prior Publication Data

US 2022/0174466 A1 Jun. 2, 2022

(30) Foreign Application Priority Data

Nov. 30, 2020 (EP) .................................... 20210709

(51) Int. Cl.
*H04W 4/00* (2018.01)
*H04W 4/90* (2018.01)
*H04W 4/14* (2009.01)

(52) U.S. Cl.
CPC ............... *H04W 4/90* (2018.02); *H04W 4/14* (2013.01)

(58) Field of Classification Search
CPC .......... H04W 4/90; H04W 4/14; H04W 4/023
See application file for complete search history.

(56) References Cited

U.S. PATENT DOCUMENTS

| | | | |
|---|---|---|---|
| 9,814,081 B2 * | 11/2017 | Wang | H04M 3/5116 |
| 2007/0139182 A1 | 6/2007 | O'Connor et al. | |
| 2008/0037762 A1 | 2/2008 | Shaffer et al. | |
| 2012/0028607 A1 * | 2/2012 | Tengler | H04W 12/03 455/410 |
| 2015/0356853 A1 * | 12/2015 | Cronin | G08B 25/016 340/669 |
| 2019/0132903 A1 | 5/2019 | Suxena | |
| 2021/0067972 A1 * | 3/2021 | Mcgrath | H04W 4/90 |

OTHER PUBLICATIONS

European Search Report for European Application No. 202107090.0 dated May 21, 2021.

* cited by examiner

*Primary Examiner* — Omoniyi Obayanju
(74) *Attorney, Agent, or Firm* — Buchanan Ingersoll & Rooney PC

(57) ABSTRACT

A method of processing an emergency incident reported to a Public Safety Answering Point (PSAP) by a user of a mobile communication device can include receiving an emergency call, determining the geolocation of the mobile communication device that made the emergency call; triggering an SMS-CB so SMS messages are sent to mobile communication devices located within a predetermined area around the determined geolocation of the device that made the emergency call, and receiving a plurality CB-SMS response messages that include objects related to the emergency incident. An object comparison on objects extracted from the responses can be performed to determine a similarity of the objects with respect to each other. It can also be verified whether the similar objects have been received from co-located mobile communication devices.

17 Claims, 3 Drawing Sheets

COMPUTER-IMPLEMENTED METHOD OF PROCESSING AN EMERGENCY INCIDENT AND EMERGENCY COMMUNICATION NETWORK

CROSS-REFERENCE TO RELATED APPLICATION

The present application claims priority to European Patent Application No. EP 20 210 709.0, which was filed on Nov. 30, 2020. The entirety of this European Patent Application is incorporated by reference herein.

FIELD

The present invention relates to a computer-implemented method of processing an emergency incident and a corresponding emergency communication network.

BACKGROUND

Short Message Service-Cell Broadcast (SMS-CB) is a widely-known feature in the telecommunication standards. SMS-CB is a method of sending messages to a plurality of mobile phone users in a defined area at the same time so as to enable a specific message being broadcasted in a region, for example, a region that is covered by the antenna of the core network.

It can be used to send emergency alerts to the mobile phone users, as for example, a warning that the corona virus is being spread in this region.

SUMMARY

We determined that the same functionality can be used directly at the operation center of an emergency service, for example, at a Public Safety Answering Point, PSAP. As the NG-911 standard defines a set of media (e.g., image, video etc.) which can be transmitted along with an emergency call, the CB-SMS could also be used to convey the required media. Thus, the CB-SMS response could initiate a new path of communication between the call taker at the PSAP, for example a first responder or the like, and people who may be present in the region of interest.

However, in case of an emergency incident that has been reported by a mobile phone user, there may be a large number of people or mobile phone users present in the emergency area that are involved in the SMS-CB procedure and thus have sent responses to the PSAP accordingly. Thus, the call taker at the PSAP might be flooded with a large number of CB-SMS responses and he or she will not be able to handle this increased volume and the complexity of responses. Moreover, it will be hard to analyze the media which are communicated via these responses. Even worse, in case an army of intelligent bots have infected the different devices which reside in a specific antenna, then the information that will be transmitted to the call taker at the PSAP will be malevolently far more complex. This will result in a delay in the communication between the call taker and the emergency caller or the people that may be willing to help with respect to the emergency incident which delay may cause, at worst, human lives. Embodiments of the apparatus and method can be configured so that the above mentioned problem of not being able to reliably process the information received in a very short time.

An embodiment of a computer-implemented method of processing an emergency incident reported to a Public Safety Answering Point (PSAP) by a user of a mobile communication device can include receiving, by a call taker at the PSAP, an emergency call initiated by a mobile telecommunication device reporting an emergency incident; determining the geolocation of the mobile communication device; triggering a Short Message Service-Cell Broadcast (SMS-CB) wherein SMS messages are sent to mobile communication devices located within a predetermined area around the determined geolocation; receiving a plurality CB-SMS response messages from the mobile communication devices, the response messages comprising objects related to the emergency incident; extracting the objects from the respective response messages; performing an object comparison on the extracted objects for determining a similarity of the objects with respect to each other; and verifying if similar objects have been received from co-located mobile communication devices.

Embodiments can allow for presenting only the valuable data to the call taker at the PSAP so that he or she is able to handle the data faster and more efficiently. The projection-friendly solution can help further ensure that the CB-SMS responses are malevolent-free so that the useless and irrelevant responses for handling the emergency incident are eliminated before being able to be forwarded to the call taker.

According to a preferred embodiment of the invention, the determining the geolocation of the mobile communication device that has initiated the emergency call can include determining the radio cell in which the mobile communication device is located.

According to another preferred embodiment of the invention, the method can also include determining the geolocation of the mobile communication devices that have sent CB-SMS response messages.

According to still a further embodiment of the invention, the method can include creating a list comprising the objects and the geolocations of the respective mobile communication devices. In such a list, the objects in the list can be ordered according to their similarity. Preferably, for determining the similarity of the objects, a machine learning algorithm can be applied.

Moreover, the method may also include determining a convergence in the distribution of the response messages with respect to the objects and respective geolocations. The response messages that do not meet the convergence criteria can be filtered out for eliminating response messages from malevolent communication devices. The response messages that have not been filtered out can then be forwarded to the PSAP for being handled by the call taker.

Preferably, the predetermined area around the emergency incident is an area having a predetermined radius around an antenna at which the mobile communication devices that are sending the response messages are registered. In some embodiments, the area can be selected as being another suitable area. In some situations, the mobile communication device of the emergency caller can be registered at the same antenna as the mobile communication devices that are sending the response messages. This same antenna can be utilized to define or select the area having the predetermined radius.

A telecommunication apparatus is also provided. In some embodiments, the apparatus includes an ESRP and/or a PSAP. In some embodiments, an emergency communication network is provided comprising an ESRP connected to a PSAP. The ESRP can be adapted for carrying out an embodiment of our method for processing an emergency incident. The ESRP and the PSAP can each be telecommunication devices that include hardware. The hardware can include at least one processor connected to a non-transitory memory and at least one transceiver. The memory can have code or an application stored thereon that defines a method that is performed by the telecommunications device when its processor runs the code or application.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

REFERENCE CHARACTERS USED IN THE DRAWINGS INCLUDE

1 Emergency communication network
2 ESRP
3 PSAP
4 antenna
5 mobile communication devices in a radio cell
6 emergency call taker

DETAILED DESCRIPTION

Figure 1:
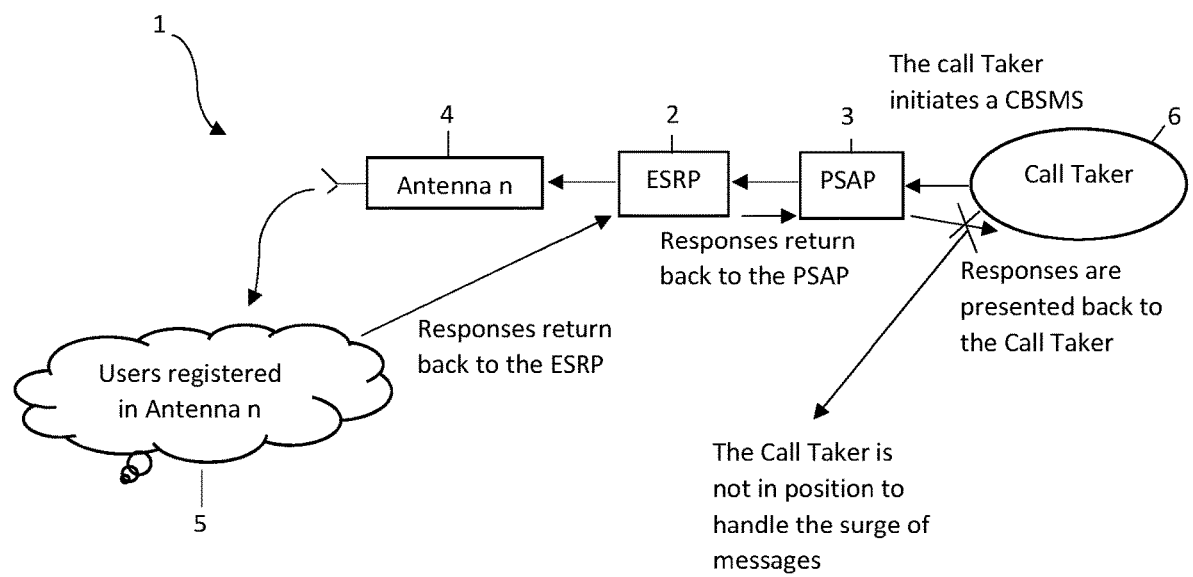
FIG. 1 shows a schematic overview for an architecture of an emergency communication network for carrying out the method of processing an emergency incident according to an embodiment of the invention.

FIG. 1 shows a schematic overview for an architecture of an emergency communication network 1 for carrying out a method of processing an emergency incident according to an embodiment of the invention which comprises an Emergency Service Routing Proxy (ESRP) and Public Safety Answering Point (PSAP) 3. Further, an antenna 4 is shown exemplarily at which a plurality of mobile phone users 5 that are present nearby within a certain radius have registered. At the PSAP 3 side, a call taker 6, as for example, a first responder is present for handling and organizing emergency events that are reported via the emergency communication network 1. For example, a mobile phone user of the plurality of users 5 registered at the antenna 4 makes an emergency call for reporting an emergency incident by dialing 911—or any other appropriate telephone number for emergency services. The call is transmitted from a corresponding carrier that forwards it via the ESRP 2 to the next or most appropriate PSAP 3, where a call taker 6 receives the emergency call. The call taker 6 may then trigger an SMS-CB procedure which is initiated by the ESRP 2 and according to which messages are sent to the users 5 that are co-located with the mobile phone user who initiated the emergency call. In this case, the mobile phone users 5 that are registered at the antenna 4 will respectively receive an SMS about the emergency event and will be asked to provide information on the emergency event, as for example, send photos or videos of the incident or the surrounding area.

The ESRP and the PSAP can each be telecommunication devices that include hardware. The hardware can include at least one processor connected to a non-transitory memory and at least one transceiver. The memory can have code or an application stored thereon that defines a method that is performed by the telecommunications device when its processor runs the code or application. Each telecommunication device can also include a display one or more input devices, and one or more output devices that can be connected to its processor.

Each of the mobile phones of different users are type of communication terminals that include a processor connected to a non-transitory memory and at least one transceiver. Each of the phones can also include a display and can also include input devices (e.g. buttons, a stylus, etc.). Some users may utilize a different type of telecommunication terminal instead of a mobile phone (e.g. a laptop computer, a tablet, etc.).

Figure 2:
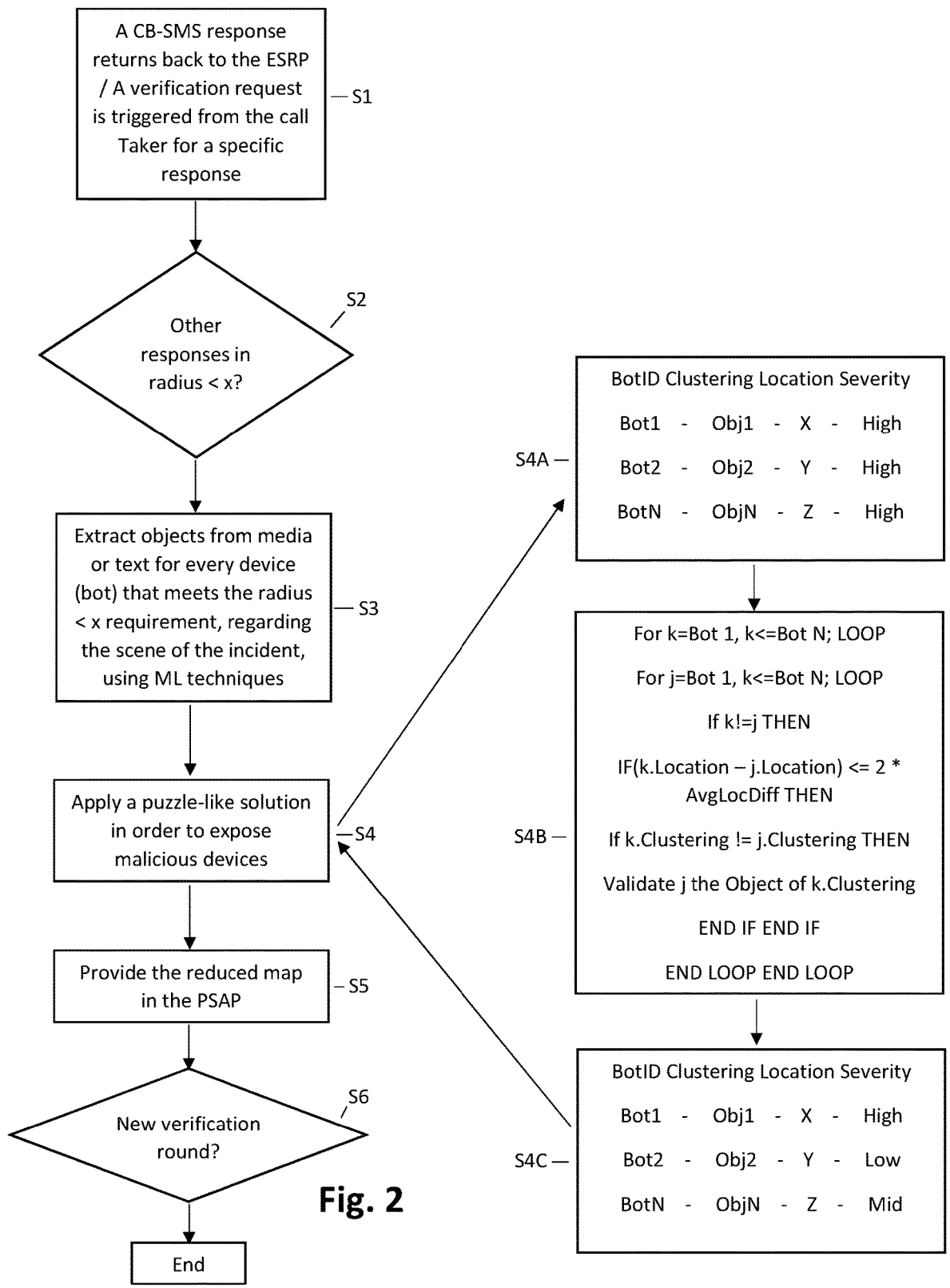
FIG. 2 shows a flow chart for the method of processing an emergency incident according to an embodiment of the invention.

FIG. 2 shows a flow chart for the method of processing an emergency incident according to an embodiment of the invention. The method starts as, in a first step S1, a new CB-SMS response is received at the ESRP 2 (see FIG. 1) and/or a verification request, i.e., an on demand request is performed by the emergency call taker 6 at the PSAP 3 (see FIG. 1).

In the second step S2, a check is performed in order to identify if other responses in a predetermined radius<x have been received from the same antenna (for example, the antenna 4 shown in FIG. 1). It is noted that the radius value x is fully configurable in order to deploy the proposed functionality in different systems and or scenarios. If in step S2 it has been verified that other responses have been received within the predefined radius x, then in the subsequent step S3 Machine Learning, ML, techniques are applied to the responses that meet the requirement for the radius "<x" specified in step S2. By applying a simple ML algorithm, there will be a convergence in the distribution of responses in terms of content and location. But this could be considered as an ideal scenario in the real world. There are many reasons for not converging in any sense. Thus, a further optimization is required in the responses that have been ordered so that their content combined with the geo-location information will maximize the value of these raw data efficiently without any comptonization. Moreover, ruling out techniques are mandatory for eliminating spam responses in order to demystify the puzzle at first and guarantee the validity of the system's accuracy at second.

As mentioned above, after receiving the CB-SMS responses which comprise, amongst others, photos or videos showing objects in the vicinity of the emergency incident, these responses will be ordered by the objects' similarity and their location as presented in the table of step S4A. The proposed procedure for doing this is to apply the ML techniques in order to identify if there are similar objects for closely located users. Even if there probably will be a convergence in distribution of the responses, it is expected that the closest located users will reply in their respective responses that they see the same object, the severity of each response will be initially considered as high. The reason for doing this is that the reliability and trust of these responses by ruling out the spam responses have to be validated.

Subsequently, an object comparison can be performed using the different classes of objects that have been detected. Namely, in step S4, the puzzle-driven proposed solution will be applied over the objects and devices that have been identified in the previous steps and that have been ordered or sorted in the objects and devices list. That is, the aim of this step is to "examine" the different devices in order to identify if their responses are accurate and guileless. The importance of this step can be crucial in some situations because the different devices may create specific responses that aim at the confusion of the emergency caller and the paralysis of the emergency service. In this context, the core of this step can be devoted to exposing potential malevolent behaviors, by verifying the responses between adjacent devices, i.e. for example, mobile phone devices that have been identified to be close to each other or even at the same geolocation. That is, if N devices which parasitize under the same antenna (e.g. antenna 4 of FIG. 1) claim that they face the same incident, in terms of context, scene objects and geolocation data, then this information simply has to be verified.

Thus, an intelligent botnet would be in position to create similar-like, fake photos, for spatial irrelevant devices, in order to confuse the call taker 6 at the PSAP. Therefore, at the PSAP side, the most efficient means to rule out such irrelevant information and devices is to verify the different objects that are included in the emergency scene and that are present on the media (photos, videos, text) captured by the different devices, as the mobile phones registered at the antenna 4 shown in FIG. 1. Thus, the verification of the objects between adjacent or nearby located devices or mobile phones seems to be a suitable and easy approach to solve this problem. The verification can be done based on the number of similar responses from the different devices or mobile phones at a specific geolocation. That is, for example, four devices or mobile phones are located in the same area with a distance less than x meters between them. If three devices report the same objects and only device reports a different object, then it is rather likely that the one differing object is not relevant or false.

Considering the above, in step S4A, a list is received as an input, the list comprising the different objects from the different devices or mobile phones along with their respective position. After this, in step S4B, for each binary device combination that meets specific location requirements, any potential object deviation triggers the verification mechanism. Therefore, if two devices or mobile phones are found to be inaccurate or deviating as to what they have reported, but they do meet the location difference requirement, then a new verification is triggered based on random objects. The random objects belong to a list of objects retrieved from the examined binary device combination, or retrieved from a separate list. The random objects will be selected using a RAND function from a list of objects that will be created upon receiving the first responses from the various devices or mobile phones. To exemplify this, it may be assumed that four devices or mobile phones return images and videos that contain ten different objects. A list comprising these objects will be created, and if there is a need to verify if the devices report the truth, then a number of these objects will be selected and will be presented to the device or mobile phone that needs to be verified.

It is noted that at the ESRP, according to an embodiment, there may be stored a default list with regular extracted objects for all emergency incidents. This separate list may be "refreshed" automatically with a predetermined configurable number of more common and/or more frequently extracted objects. The option for using a) a list of objects retrieved from the examined binary device combination or b) the default list may be configurable at the ESRP 2. In this case, the algorithm may consult the value of this configuration. This is because it is not meaningful to only verify the true captured objects between two devices or mobile phones. Moreover, it is noted that a malicious bot would be able to easily respond positively to everything it was presented as a possible emergency incident scene object.

After the verification outlined above, in step S4C, a far more reduced map is ready to be presented to the call taker at the PSAP.

Figure 3:
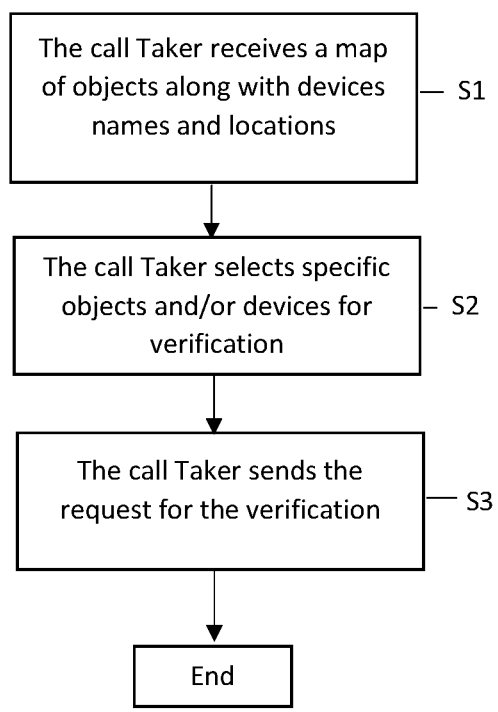
FIG. 3 shows another flow chart comprising a sequence of verification steps according to an embodiment of the invention.

FIG. 3 shows a sequence of verification steps according to an embodiment of the invention. According to FIG. 3, the call taker will receive a data structure which contains the different objects of the scene or the emergency incident—prioritized based on the severity level after applying the verification mechanism explained above with respect to FIG. 2—along with a list of the devices or mobile phones and their respective location. That is, in this case the call taker will be able to know, for example, that a first device and a second device have a distance of four meters between them. Additionally, the call taker has the overview of the emergency incident, and also of the different objects that have been extracted from the images and videos. Using these pieces of data, the call taker will be advised about the accuracy of the provided data, ruling out useless responses on the one hand, and exponentially increasing the dispatching time of the incident reliably on the other hand. Moreover, the call taker will be able to trigger an "on demand" verification. This may be done either by manually selecting a set of scene objects that will need to be verified by the devices, or by using random objects selected from the emergency scene or from a pre-defined list.

It should be appreciated that different embodiments of the method, system, a PSAP, ESRP, and an apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of processing an emergency incident reported to a Public Safety Answering Point (PSAP) comprising:
  receiving at the PSAP an emergency call initiated by a mobile telecommunication device reporting an emergency incident;
  determining the geolocation of the mobile communication device;
  triggering a Short Message Service-Cell Broadcast (SMS-CB), wherein SMS messages are sent to mobile communication devices located within a predetermined area around the determined geolocation;
  extracting objects from a plurality of CB-SMS response messages to the SMS-CB received from the mobile communication devices, the objects related to the emergency incident;

performing an object comparison on the extracted objects for determining a similarity of the objects with respect to each other;
verifying whether similar objects have been received from co-located mobile communication devices;
creating a list comprising the objects and the geolocations of the respective mobile communication devices, wherein the objects in the list are ordered according to their similarity;
determining a convergence in the distribution of the CB-SMS response messages with respect to the objects and respective geolocations; and
filtering out the CB-SMS response messages that do not meet convergence criteria for eliminating CB-SMS response messages from malevolent communication devices.

2. The method of claim 1, comprising:
forwarding the CB-SMS response messages that have not been filtered out to the PSAP for being handled by the call taker.

3. The method of claim 1, wherein the predetermined area around the emergency incident is an area having a predetermined radius around an antenna at which the mobile communication devices that are sending the CB-SMS response messages are registered.

4. The method of claim 3, wherein the mobile communication device of the emergency caller is registered at the same antenna as the mobile communication devices that are sending the CB-SMS response messages.

5. The method of claim 1, wherein a machine learning algorithm is applied for determining the similarity of the objects.

6. A computer-implemented method of processing an emergency incident reported to a Public Safety Answering Point (PSAP) comprising:
receiving at the PSAP an emergency call initiated by a mobile telecommunication device reporting an emergency incident;
determining the geolocation of the mobile communication device;
triggering a Short Message Service-Cell Broadcast (SMS-CB), wherein SMS messages are sent to mobile communication devices located within a predetermined area around the determined geolocation;
extracting objects from a plurality of CB-SMS response messages to the SMS-CB received from the mobile communication devices, the objects related to the emergency incident, wherein the predetermined area is an area having a predetermined radius around an antenna at which the mobile communication devices that send the CB-SMS response messages are registered and wherein the mobile communication device of the emergency caller is also registered at the antenna;
performing an object comparison on the extracted objects for determining a similarity of the objects with respect to each other; and
verifying whether similar objects have been received from co-located mobile communication devices;
creating a list comprising the objects and the geolocations of the respective mobile communication devices, wherein the objects in the list are ordered according to their similarity;
determining a convergence in the distribution of the CB-SMS response messages with respect to the objects and respective geolocations;
filtering out the CB-SMS response messages that do not meet convergence criteria for eliminating CB-SMS response messages from malevolent communication devices; and
forwarding the CB-SMS response messages that have not been filtered out to the PSAP for being handled by the call taker.

7. The method of claim 6, wherein the determining of the geolocation of the mobile communication device that has initiated the emergency call comprises determining a radio cell in which the mobile communication device is located.

8. The method of claim 6, comprising determining the geolocation of the mobile communication devices that have sent CB-SMS response messages.

9. An emergency communication apparatus comprising:
an Emergency Service Routing Proxy (ESRP) connectable to a Public Safety Answering Point (PSAP), wherein the ESRP comprising a processor connected to non-transitory memory and at least one transceiver, the ESRP configured to perform a method comprising:
determining a geolocation of a mobile communication device that sent an emergency call reporting an emergency incident;
triggering a Short Message Service-Cell Broadcast (SMS-CB), wherein SMS messages are sent to mobile communication devices located within a predetermined area around the determined geolocation,
extracting objects from a plurality of CB-SMS response messages to the SMS-CB received from the mobile communication devices, the objects related to the emergency incident;
performing an object comparison on the extracted objects for determining a similarity of the objects with respect to each other; and
verifying whether similar objects have been received from co-located mobile communication devices;
determining a convergence in a distribution of the CB-SMS response messages with respect to the objects and respective geolocations; and
filtering out the CB-SMS response messages that do not meet convergence criteria for eliminating the CB-SMS response messages from malevolent communication devices.

10. The emergency communication apparatus of claim 9, comprising the PSAP.

11. The emergency communication apparatus of claim 10 comprising the mobile communication devices that sent the CB-SMS response messages.

12. The emergency communication apparatus of claim 9, wherein the method also comprises:
creating a list comprising the objects and the geolocations of the respective mobile communication devices, wherein the objects in the list are ordered according to their similarity.

13. The emergency communication apparatus of claim 9, wherein the method also comprises:
creating a list comprising the objects and the geolocations of the respective mobile communication devices, wherein the objects in the list are ordered according to their similarity; and
forwarding the CB-SMS response messages that have not been filtered out to the PSAP for being handled by the call taker.

14. The emergency communication apparatus of claim 13, wherein the predetermined area is an area having a predetermined radius around an antenna at which the mobile communication devices that send the CB-SMS response messages are registered and wherein the mobile communication device of the emergency caller is also registered at the antenna.

15. The emergency communication apparatus of claim 9, wherein the method also comprises:
   creating a list comprising the objects and the geolocations of the respective mobile communication devices, wherein the objects in the list are ordered according to their similarity.

16. The emergency communication apparatus of claim 13, wherein the determining of the geolocation of the mobile communication device that has initiated the emergency call comprises determining a radio cell in which the mobile communication device is located.

17. The emergency communication apparatus of claim 16, comprising the PSAP.

\* \* \* \* \*